United States Patent [19]
Byrne

[11] Patent Number: 4,818,208
[45] Date of Patent: Apr. 4, 1989

[54] MOLD CLOSING DEVICE

[76] Inventor: John R. Byrne, 1519 Prospect St., Watertown, Wis. 53094

[21] Appl. No.: 167,494

[22] Filed: Mar. 14, 1988

[51] Int. Cl.⁴ ............................................. A01J 21/00
[52] U.S. Cl. ................................. 425/394; 425/436.1; 425/437; 425/436 RM; 264/339; 249/66 A; 249/66 C; 249/66.1
[58] Field of Search ..................... 425/383, 394, 436.1, 425/437, 444, 554, 556, DIG. 5; 249/66 A, 66 C; 264/339

[56] References Cited
U.S. PATENT DOCUMENTS
4,340,352 7/1982 Hayberg .............................. 264/339
FOREIGN PATENT DOCUMENTS
115419 6/1985 Japan ................................ 425/450.1

Primary Examiner—Bernard Nozick

[57] ABSTRACT

A device for closing a lid of a cap while the cap is still in the mold where it was formed. The device includes a plate forming the moveable side of a parallelogram that rocks between the mold plates during mold opening to press the lid closed and then rocks back out of the way to allow part ejection. The motion is activated by mold opening so the molding cycle is not lengthened by its action.

1 Claim, 4 Drawing Sheets

MOLD CLOSING DEVICE

PROBLEM

The discovery of polypropylene's self-hinging property has led to the development of a wide variety of molded plastic parts, such as boxes with integral lids that formerly would have been made in two pieces. Hinged Bottle closures with integral lids are now being molded in the billions annually. They are usually snapped shut outside of the mold. This requires extra handling, expensive auxiliary equipment, and the possibility of scuffing and damaging the closure.

HISTORY

One solution has been to close the lid before the closure is ejected from the mold. This was done with closing plates that are hydraulically positioned into the mold after it has opened. Individual pistons then push each lid closed. The pistons must be retracted and the plate withdrawn before parts can be ejected. The procedure is slow, it can contaminate parts with hydraulic fluid, it must be tied to an external hydraulic source and tied into a core-pull mold sequence, which is not available on all molding machines. The addition to the cycle time adds to the cost of manufacturing the closures and makes it more economical to close parts outside the mold.

SOLUTION

An in mold closer can operate as the mold is opening, utilizing the opening action of the mold to drive a simple mechanical mechanism. It can swing into position, close the lids and swing out again by the time the mold has moved to eject position.

The mechanical closing mechanism and the method of activation are the subject of this patent.

A closing plate with adjustable pushers at each closing station can be pivotally fastened to a frame outside of and securely fastened to the moveable side of the mold. The plate is attached with rocker arms that cause it to rock into and out of the mold. The back links of the parallelogram extend beyond the surface of the closing plate and contact stiffening ribs attached to the plate in the closing position, creating one long lever arm. The reciprocating action is driven by a crank arm, attached to a gear that meshes with a rack that is fastened to the stationary side of the mold.

Opening the mold pulls the rack past the gear, turning the crank which cases the closing plate to rise and swing into the opening mold. As opening progresses, lids are blow over before the pushers contact them, the closing plate and back rocker arms meet and the crank arm moves through dead center maximizing the force available to close the lids.

Further opening causes the closing plate to swing away from the molded parts, clearing the area for part ejection.

Closing the mold causes the mechanism to "dry cycle" back into the mold and way out where it will remain during the injection and cure portion of the cycle.

The mechanism is efficient because it uses the mold opening time for activation and does not increase cycle time. It is clean, using no hydraulic or other outside power source. It is practically fool-proof as it does not rely on outside power source(s) and sequencing for its operation. It is simple and it is positive.

BRIEF DESCRIPTION OF THE DRAWINGS

The invention will be further described by reference to the accompanying drawings which are made a part of this specification. The reader is cautioned to note that the specific form of this invention in said drawings is for illustrative purposes and purposes of example only. Various changes and modifications could obviously be made within the spirit and scope of the invention.

DETAILED DESCRIPTION OF THE ILLUSTRATED EMBODIMENT

Figure 1:
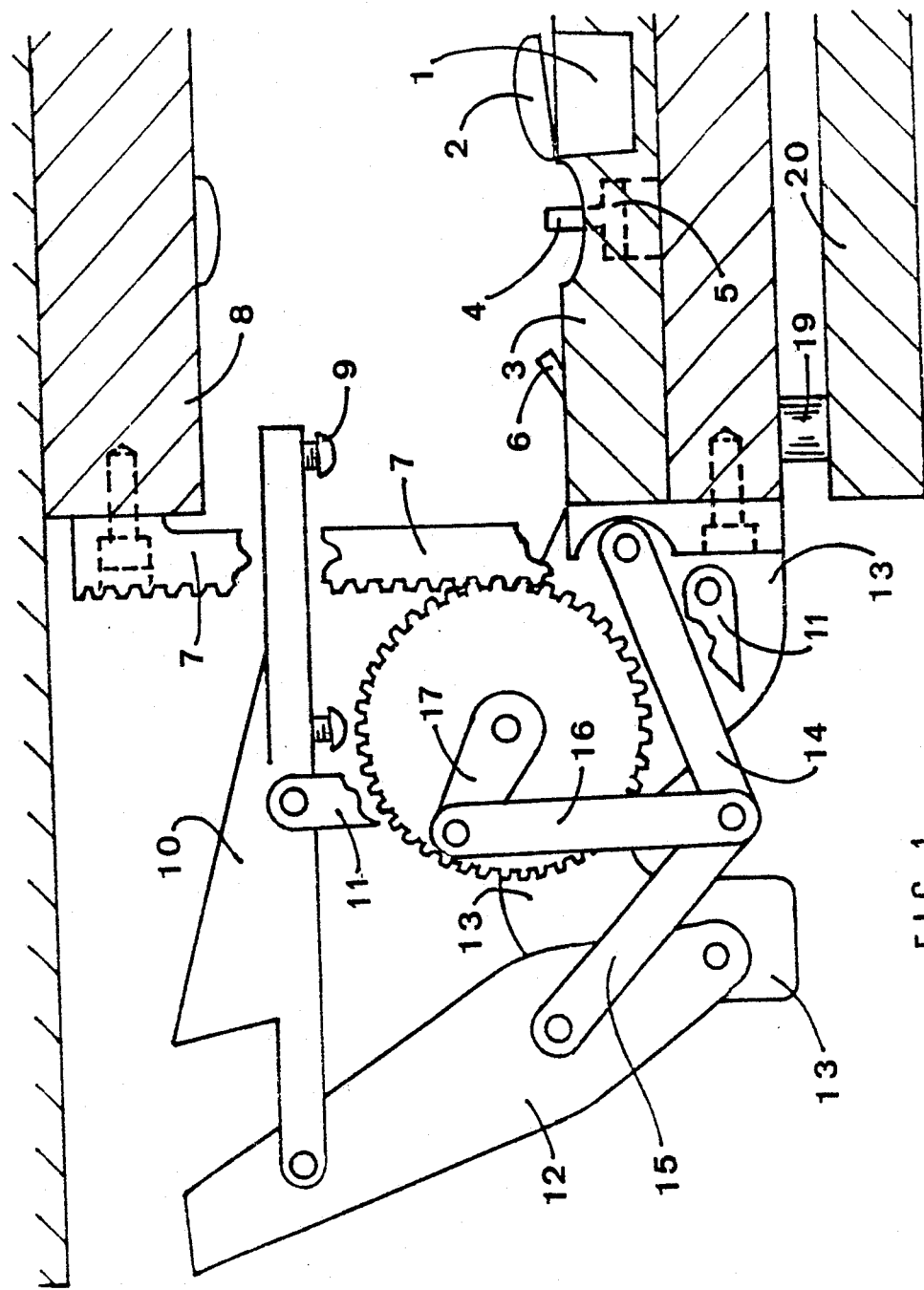
FIG. 1 is a schematic presentation of the closing device in relation to the mold the cap and the lid to be closed.
Figure 2:
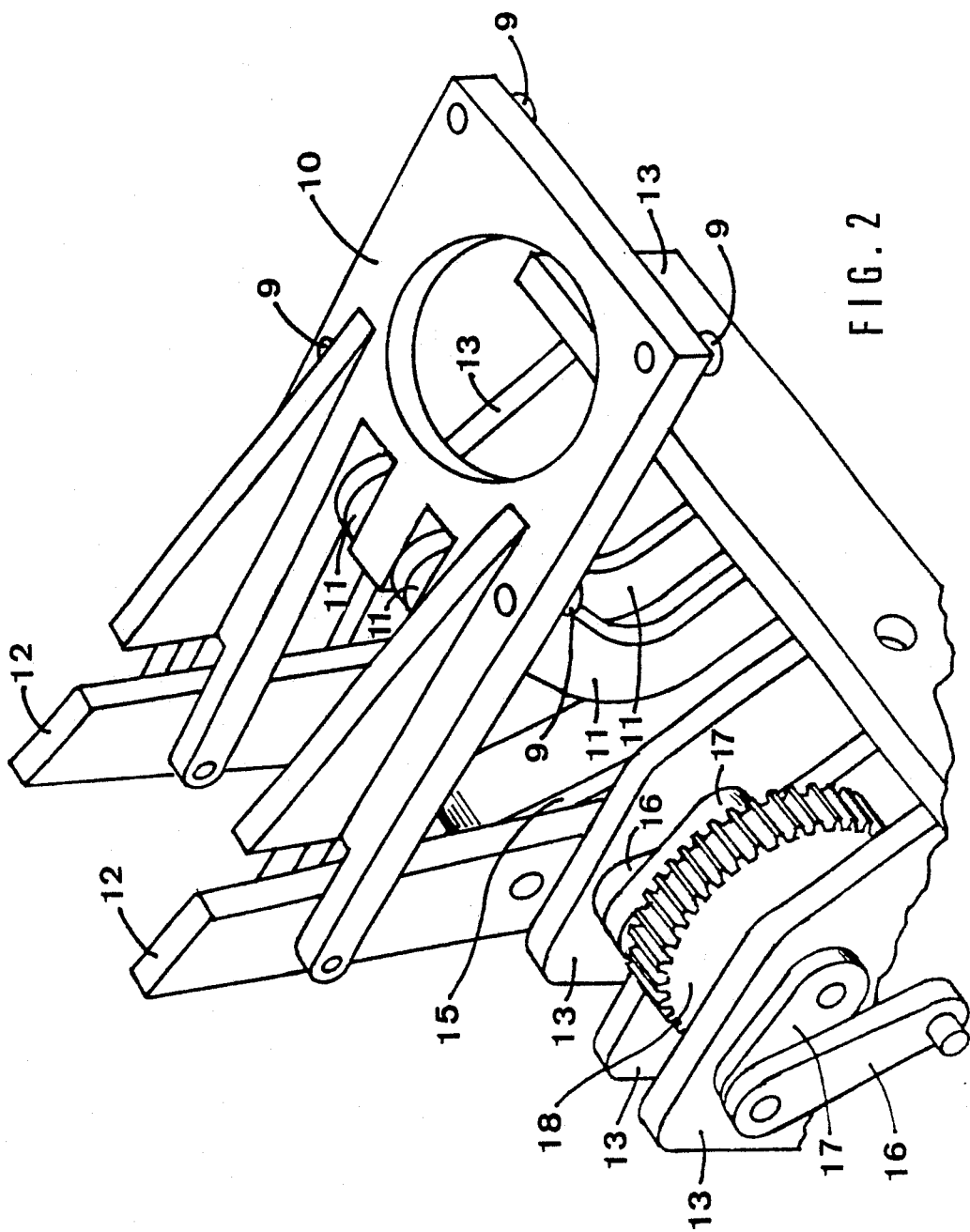
FIG. 2 is a perspective view of the device showing it in the same position.

Referring to FIG. 1 of the drawings, the cap 1 is molded with an integral hinge onto the lid 2 in the moveable plate 3 of the mold. As the mold is opening, the lid 2 is lifted by the ejector pin 4 attached to a pneumatic cylinder 5 and blown partially closed by an air tube 6. A gear rack 7 attached to the stationery mold half 8 drives the gear 18 to initiate and continue the final closing action. A crank arm 17, keyed to gear 18 pushes down on the joint between the restraining links 14 & 15, driving the outer bar 12 of the parallelogram toward the mold 3. The closing plate 10 is maintained in a plane parallel to mold plate 3 by the front link 11. When crank 17 goes through bottom dead center, crank link 16 collapses the retaining links 14 & 15 to their maximum, extending almost 100% of the available force on the back retaining link 15, pulling the back arm 12 toward the mold.

Figure 3:
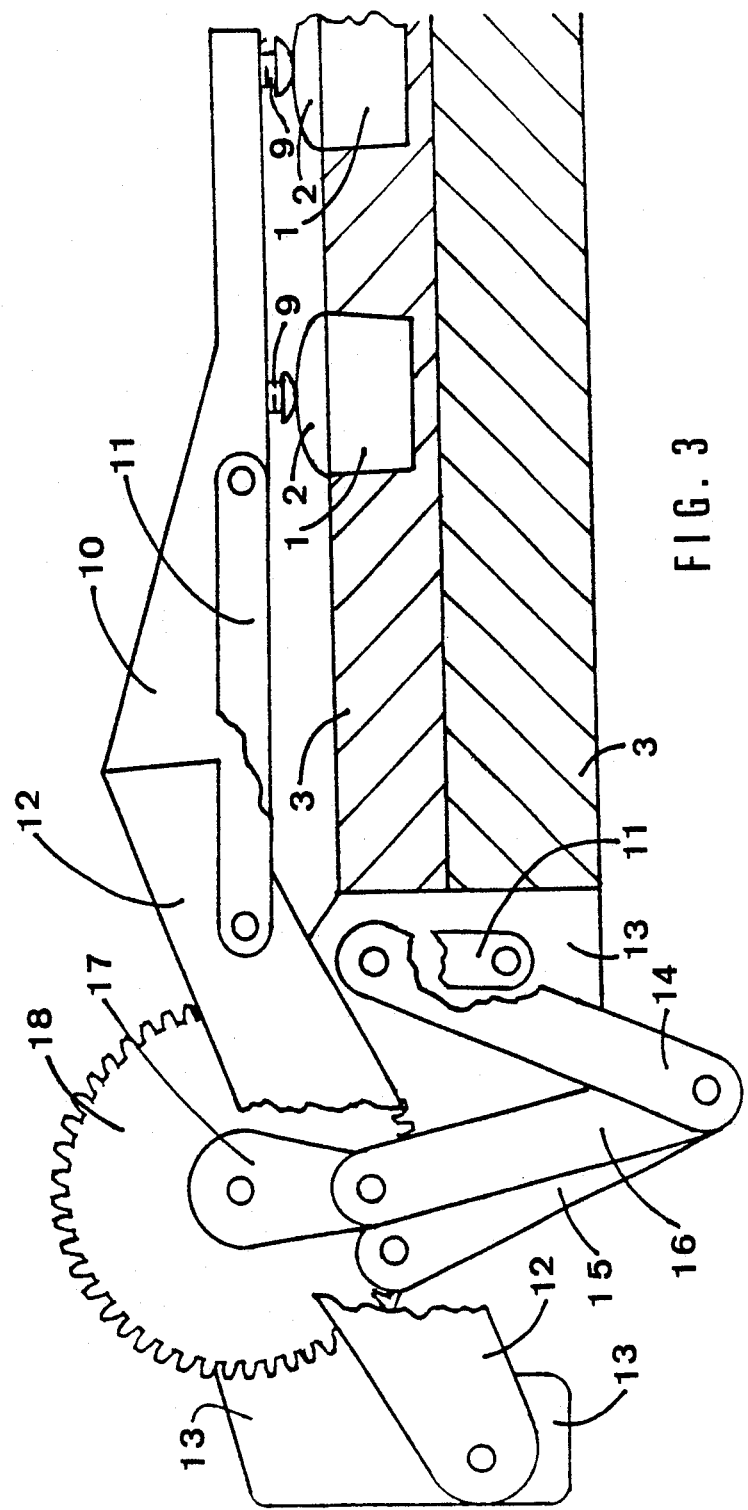
FIG. 3 is a schematic view of the device in the closing mode.

FIG. 3 shows the crank 17 approaching bottom dead center, putting maximum force on the back arm 12 which has made contact with the wedge above the closing plate 10 forming one stiff, continuous arm. As the gear 18 drives the crank 17 thru B, D, C, the closing plate 10, through the nylon screws 9, are adjustable, and can be tuned to create exactly the closing force needed.

Figure 4:
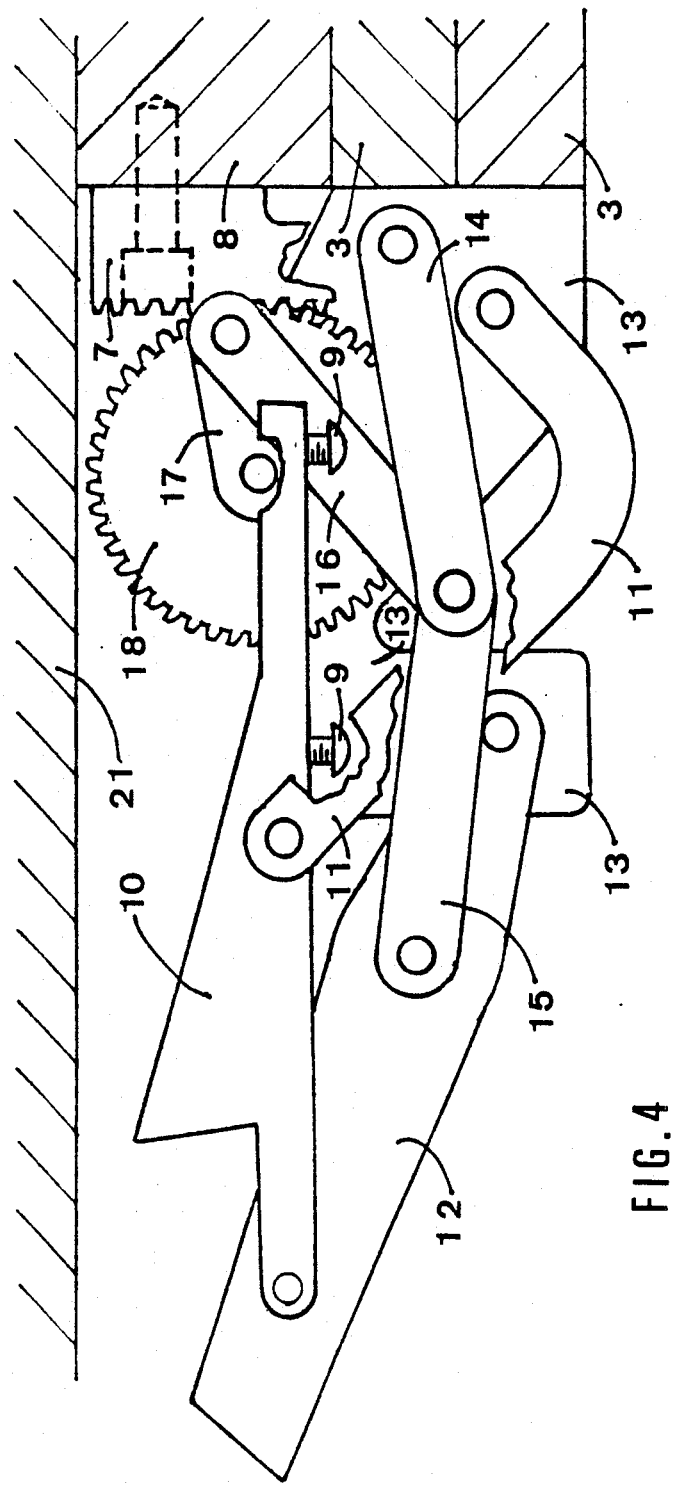
FIG. 4 shows the invention tucked safely outside of the mold while the mold is closed.

FIG. 4 shows the closing device in the mold closed position. It should be noted that the addition of the restraining links 14 & 15, which make the mechanism an 8 bar linkage, allow about 100° of the gear 18 rotation with the mold 8, 3 & 20, in the closed position. This keeps the closing plate 10, with closing buttons 9, free of the area between the stationary mold plate 8 and the moveable plate 3 until sufficient distance has been developed to allow the closing plate 10 to enter the mold area. It can be seen that the entire mechanism can be affixed to the outside of the mold and enters the molding area only during the portion of the cycle when mold movement drives the closing plate 10 between the stationary mold plate 8 and the moveable plate 3.

The foregoing sets forth the manner in which the objects of the invention are achieved.

I claim:

1. A mold comprising a moveable mold member provided with adjacent cavities for a cap and a lid, ejection means on said moveable mold member beneath the cavity for the lid to eject said lid from said lid cavity, a rack attached to the fixed mold member and a gear including a crank arm attached to said moveable mold member, a pivoted linkage attached to said moveable mold member and to said crank arm, said pivoted linkage also being attached to a plate having means thereon extending towards the moveable mold member for forcing a lid closed, said rack, gear and pivoted linkage moving said plate into the space between the mold members when the mold is open and moving said plate out of the space between the mold members when the mold is closed.

* * * * *